(12) United States Patent
Isenhour et al.

(10) Patent No.: US 10,007,071 B2
(45) Date of Patent: Jun. 26, 2018

(54) OPTICAL BODIES HAVING A TOTAL INTERNAL REFLECTION SURFACE AND A SHORT OPTICAL PATH LENGTH

(71) Applicant: Corning Optical Communications LLC, Hickory, NC (US)

(72) Inventors: Micah Colen Isenhour, Lincolnton, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/229,585

(22) Filed: Aug. 5, 2016

(65) Prior Publication Data

US 2016/0341917 A1  Nov. 24, 2016

Related U.S. Application Data

(63) Continuation of application No. PCT/US2015/015577, filed on Feb. 12, 2015.

(Continued)

(51) Int. Cl.
| | |
|---|---|
| *G02B 6/36* | (2006.01) |
| *G02B 6/42* | (2006.01) |
| *G02B 6/32* | (2006.01) |

(52) U.S. Cl.
CPC ........... *G02B 6/4204* (2013.01); *G02B 6/325* (2013.01); *G02B 6/428* (2013.01); *G02B 6/4214* (2013.01);

(Continued)

(58) Field of Classification Search
CPC ........ G02B 6/4214; G02B 6/325; G02B 6/34; G02B 6/4231; G02B 6/428
(Continued)

(56) References Cited

U.S. PATENT DOCUMENTS

| | | | | |
|---|---|---|---|---|
| 4,824,202 | A * | 4/1989 | Auras | .................. G02B 6/3843 385/92 |
| 5,241,612 | A * | 8/1993 | Iwama | ..................... G02B 6/32 385/59 |

(Continued)

FOREIGN PATENT DOCUMENTS

| | | |
|---|---|---|
| EP | 1630578 A2 | 3/2006 |
| EP | 2581776 A1 | 4/2013 |

(Continued)

OTHER PUBLICATIONS

Patent Cooperation Treaty, International Search Report for PCT/US2015/015577, dated May 11, 2015, 5 pages.

(Continued)

*Primary Examiner* — Robert Tavlykaev
(74) *Attorney, Agent, or Firm* — Robert L. Branham

(57) ABSTRACT

Optical bodies having a total internal reflection surface and a short optical path length along with electronic devices using the optical bodies are disclosed. The optical body comprises at least one optical channel and comprises a total internal reflection (TIR) surface and a lens located on a bottom of the optical body. By way of example, the short optical path length may have the lens of the optical body at a distance of 500 microns or less from a front end of the optical module. In another embodiments, the optical body may include a window adjacent to the front end. Methods for making an optical connector are also disclosed.

23 Claims, 3 Drawing Sheets

Related U.S. Application Data

(60) Provisional application No. 61/940,654, filed on Feb. 17, 2014.

(52) U.S. Cl.
CPC .......... *G02B 6/4206* (2013.01); *G02B 6/4274* (2013.01); *G02B 6/4292* (2013.01)

(58) Field of Classification Search
USPC ............. 385/36, 47, 88, 89, 92, 93; 398/139
See application file for complete search history.

(56) References Cited

U.S. PATENT DOCUMENTS

| | | | |
|---|---|---|---|
| 6,041,156 A | | 3/2000 | Heitmann |
| 6,213,650 B1* | | 4/2001 | Moriyama ............ G02B 6/4214 385/88 |
| 7,097,468 B2 | | 8/2006 | Ice |
| 8,328,434 B2 | | 12/2012 | Wang et al. |
| 8,348,525 B2 | | 1/2013 | Wang et al. |
| 8,414,309 B2 | | 4/2013 | Meadowcroft et al. |
| 2007/0054553 A1 | | 3/2007 | Nishio et al. |
| 2007/0249193 A1 | | 10/2007 | Penumatcha et al. |
| 2011/0229077 A1* | | 9/2011 | Fortusini ................. G02B 6/322 385/33 |
| 2011/0229083 A1 | | 9/2011 | Dainese Junior et al. |
| 2011/0249947 A1 | | 10/2011 | Wang et al. |
| 2012/0027345 A1* | | 2/2012 | Castagna ............ G02B 6/4292 385/33 |
| 2012/0155803 A1* | | 6/2012 | Benjamin ............ G02B 6/3886 385/33 |
| 2012/0189252 A1* | | 7/2012 | Bhagavatula ............ G02B 6/32 385/79 |
| 2012/0195556 A1 | | 8/2012 | Wang et al. |
| 2012/0266434 A1 | | 10/2012 | Yu et al. |
| 2013/0259419 A1 | | 10/2013 | Charbonneau-Lefort |
| 2013/0259423 A1 | | 10/2013 | Charbonneau-Lefort |
| 2013/0266261 A1 | | 10/2013 | Lam et al. |
| 2014/0105543 A1 | | 4/2014 | De Jong |
| 2014/0169741 A1 | | 6/2014 | Fortusini et al. |
| 2014/0241672 A1* | | 8/2014 | Isenhour ............ G02B 6/4206 385/79 |
| 2014/0308003 A1 | | 10/2014 | Benjamin et al. |

FOREIGN PATENT DOCUMENTS

| | | |
|---|---|---|
| WO | 2012/099769 A2 | 7/2012 |
| WO | 2013/159015 A1 | 10/2013 |
| WO | 2013148763 A1 | 10/2013 |
| WO | 2013163389 A1 | 10/2013 |

OTHER PUBLICATIONS

Patent Cooperation Treaty, International Search Report for PCT/US2015/22896, dated Jun. 3, 2015, 4 pages.
Patent Cooperation Treaty, Written Opinion of the International Searching Authority for PCT/US2015/015577, 6 pages.
European Patent Office, Written Opinion of the International Searching Authority for EP Application No. 15706351.2-1562, 9 pages.

* cited by examiner

OPTICAL BODIES HAVING A TOTAL INTERNAL REFLECTION SURFACE AND A SHORT OPTICAL PATH LENGTH

CROSS-REFERENCE TO RELATED APPLICATIONS

This application is a continuation of International Application No. PCT/US2015/15577, filed on Feb. 12, 2015, which claims the benefit of priority under 35 U.S.C. § 119 of U.S. Provisional Application No. 61/940,654, filed on Feb. 17, 2014, the content of which is relied upon and incorporated herein by reference in their entirety.

FIELD

The disclosure is directed to optical bodies having a total internal reflection surface and a short optical path length along with optical connectors and electronic devices that use the optical bodies.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in electronic devices compared with copper-based connectivity. By way of example, devices such as smart phones, displays, televisions, storage devices, laptops, cameras and tablets are exposed to rough handling and harsh environments and the consumer will expect optical connectivity to handle these demanding conditions. These types of devices will require a large number of mating/unmating cycles during their lifetime. Further, as certain devices become compact and relatively thin, the associated optical connectors should also become compact with a relatively small footprint while still being robust enough for consumer applications.

Optical connections require that the optical channels at an optical interface between devices have a suitable optical alignment for transmitting an optical signal at the interface and into the desired device such as when using a plug and a receptacle are mated at an optical interface. The optical channels of the devices also require a suitable optical alignment with active components of the device for the respective transmit and receive optical channels. This optical alignment of the optical channels also typically becomes more difficult as the number of optical channels of the device increases. Thus, there is an unresolved need for optical connectors that may be used with consumer or other electronic devices that can accommodate harsh treatment of the consumer environment, the large number of mating/unmating cycles expected during the lifetime of the device, a suitably compact footprint along with a suitable optical alignment of optical channels for transmitting/receiving optical signals.

SUMMARY

The disclosure is directed to optical bodies having a total internal reflection (TIR) surface and a short optical path length used for making optical connections. In one embodiment, the optical body comprises a front end, a top and a bottom, and at least one optical channel comprising a TIR surface and a lens. The lens is located on the bottom of the body and located at a distance of 500 microns or less from the front end; however, other suitable distances are possible. The optical body may further comprise a window adjacent to the front end.

Another embodiment of the disclosure is directed to an optical body for making an optical connection comprising a front end, a top and a bottom, and at least one optical channel comprising a total internal reflection (TIR) surface and a lens. The lens is located on the bottom and is a distance of 500 microns or less from the front end; however, other suitable distances are possible. The optical body further comprises a window adjacent to the front end, and a circuit board having at least one active component, wherein the circuit board is attached to the optical body so the at least one active component of the circuit board is aligned with the lens.

Another aspect of the disclosure is directed to an electronic device, comprising an optical receptacle comprising optical body comprising a front end, a top and a bottom, and at least one optical channel comprising a total internal reflection (TIR) surface and a lens. The lens is located on the bottom and is a distance of 500 microns or less from the front end and a circuit board having at least one active component. The circuit board is attached to the optical body so the at least one active component of the circuit board is aligned with the lens, and a window attached to the front end of the optical body.

The disclosure is also directed to a method for making an optical connector. The method comprising the steps of providing an optical body comprising a front end, a top and a bottom, and at least one optical channel comprising a total internal reflection (TIR) surface and a lens. The lens is located on the bottom and is a distance of 500 microns or less from the front end, and attaching the optical body to a shell of the optical connector.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The optical connectors disclosed herein enable high-speed data applications for transmitting optical signals to and from electronic devices. Further, the optical connectors using the optical bodies disclosed may have a relatively small and compact footprint so that they are useful for devices having optical receptacles or optical ports such as tablets, smart phones, displays, televisions, storage devices, cameras, and the like, but the concepts disclosed may be adapted for use with cable assemblies as well as other suitable applications. The optical bodies disclosed comprise a relatively short optical path and total internal reflection surface. The short optical path lengths of the optical channels of the optical bodies inhibit optical beam walk-off from the desired target area such as to or from an active device such as a photodiode or laser compared conventional optical bodies having relatively long optical path lengths. Stated another way, the short path length of the optical body designs disclosed herein allow the optical signal to be less sensitive to angular error and/or offset for assembly to active components on a circuit board and/or when mating at the optical interface. In one embodiment, the optical body comprises a front end, a top, a bottom, and at least one optical channel comprising a total internal reflection (TIR) surface and a lens. The lens is located on the bottom of the optical body and is at distance of 500 microns or less from the front end, but other shorter distances are also possible such as 300 microns or less. The concepts disclosed provide the optical body with a relatively short optical path length and aid in making optical connectors for electronic devices that are easier to align with active optical components during assembly since the designs inhibit optical beam walk-off. Likewise, the mating at the optical interface of optical bodies is less susceptible to misalignment and/or optical beam walk-off when mating with a complimentary connector while maintaining suitable optical performance. Further, the optical bodies disclosed may have relatively small footprints that are advantageous for use with electronic devices having thin and compact profiles and the like.

Figure 1:
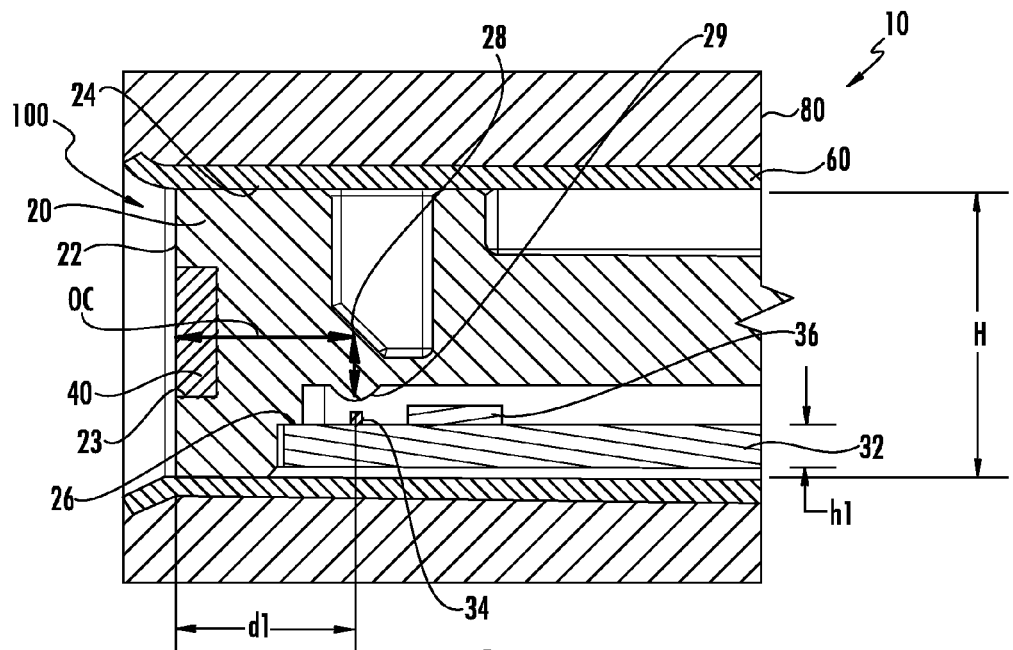
FIG. 1 is a cross-sectional view of a portion of an electronic device having an optical connector with an optical body.

FIG. 1 is a cross-sectional view of a portion of an electronic device 10 having an optical connector 100 with an optical body 20 according to the concepts disclosed. In this embodiment, optical connector 100 is configured as an optical receptacle, which is a portion of electronic device 10 such as a laptop, tablet, smart phone, display television, data storage device, camera, etc., but the concepts disclosed may be used in other electronic devices as desired. In other words, the optical body 20 is a portion of an electronic device. Optical connector 100 may also optionally include a shell 60 that fits into an opening of a housing 80 of electronic device 10.

Optical body 20 of optical connector 100 is used for making an optical connection with a complimentary optical connector such as an optical plug that is a portion of a cable assembly or the like. In other variations, the concepts of the disclosed optical bodies may be used with an optical plug such as with active optical cable assemblies. Optical body 20 includes a front end 22, a top 24, a bottom 26, at least one optical channel OC comprising a total internal reflection (TIR) surface 28 and a lens 29. The TIR surface 28 of optical body 20 is used for turning the optical signal toward lens 29 or toward the front end 22 depending on whether the optical channel OC is a transmit optical channel or a receive optical channel. The TIR surface 28 turns the optical signal due to the difference in the indexes of refraction at the interface between the material of optical body 20 and the air.

Moreover, the TIR surfaces 28 are located on angled surfaces disposed on the top 24 of optical body 20. By way of example and not limitation, the TIR surface 28 is disposed at an angle such as about a 45 degree angle with respect to the horizontal direction, but other angles are possible. This arrangement allows the optical connector 100 to advantageously have a relatively small footprint, especially a relatively small height for matching the small heights of thin devices such as tablets, smart phones and the like. By way of example, the optical connector 100 may have a height of about 5 millimeters or less, 3 millimeters or less, but other dimensions are possible.

Lens 29 is located on the bottom 26 of optical body 20 and is located a distance d1 of 500 microns of less from the front end 22. Thus, the optical channel OC path length of optical body 20 may be relatively short compared with conventional optical bodies. Consequently, the optical bodies disclosed herein may inhibit optical beam walk-off from the desired target area compared with the conventional optical bodies. As shown, the total optical channel OC path length of optical body 20 includes a horizontal component and a vertical component. Further, the distance d1 may have any suitable value from the front end 22 to maintain a relatively short optical path length for the optical path length. As an example, the distance d1 may be 300 microns or less from the front end 22. In other embodiments, the optical bodies can have more lenses at other locations as desired such as adjacent to the front end. The optical body 20 is formed from a suitable material for transmitting optical signals at the desired wavelength. As an example, the optical body 20 may be formed from LEXAN® or other suitable material. Although only one lens 29 is visible in the cross-section of FIG. 1, the optical body 20 may have a plurality of lenses and a plurality of optical channels such as transmit and receive optical channels. Further, the path lengths of the transmit and receive optical channels OC may have the same or different path lengths depending on the desired optical prescription of the design.

In this embodiment, optical body 20 further comprises a window 40 adjacent to the front end 22. Although a window is shown in the embodiments, the concepts of the disclosure may be used with optical bodies that do not include a window. As shown, window 40 is secured into a recess 23 adjacent to the front end 22 so that the window 40 is generally flush with the front end 22. In other embodiments, the optical bodies can have one or more lens disposed at the within the recess and behind window 40 with a gap therebetween. Window 40 is formed from any suitable material(s) such as a glass or polymer that allows the optical signals being transmitted to suitably pass therethrough. For instance, the window 40 may be formed from any suitable material such as a polymer such as Ultem® or Zeonex® or a glass such as a chemically strengthened such as available from Corning, Incorporated of Corning, N.Y. Moreover, the window 40 may have a suitable coating such as an anti-reflection coating and/or a scratch-resistant coating as desired. Window 40 is suitable for applications that anticipate a relatively large number of mating/unmating cycles or environments that may be exposed to dirt and debris such as consumer devices; however, suitable material(s) for components should be selected to withstand the desired number of mating cycles.

As shown, a circuit board 32 is attached to the optical body 20. The circuit board 32 has at least one active (optical) component 34 electrically attached thereto. Active components 34 are devices capable of transmitting and/or receiving optical signals and communicating with the respective optical channels OC of optical body 20. Active component may include, but are not limited to light emitting diodes and laser diodes, such as vertical-cavity surface-emitting lasers ("VCSEL") for transmit channels and photodetectors such as photodiodes and the like for the receive optical channels. If used, the one or more lenses 29 of the optical body 20 are used for collimating or focusing the optical signal, thereby altering the optical window for optical alignment with the one or more active components 34.

The at least one active component 34 of circuit board 32 is suitably aligned with lens 29 for optical communication. As an example and not limitation, the circuit board 32 may be attached to the optical body 20 so that the one or more active (optical) components 34 attached to circuit board 32 are substantially aligned with the one or more lenses 29. More specifically, circuit board 32 is optically aligned and attached to the bottom 23 of optical body 20. In this embodiment, circuit board 32 is configured as a daughter circuit board that is electrically attached to a mother board in a suitable manner. For instance, the daughter circuit board may have electrical pads, leads or a tether at a portion of the circuit board for making an electrical connection. Further, circuit board 32 has a plan view footprint that is smaller than the plan view footprint of the optical body 20 so that the circuit board 32 is recessed within a bottom pocket of the optical body 20. Consequently, the optical body assembly and the optical connector 100 may have a smaller height than other connector constructions since a height h1 of the circuit board 32 and the electrical components overlaps with a height H of the optical body 20 (e.g., height h1 (and the electrical components) are nested within height H). With this overlapping (e.g., nested) design between the circuit board and the optical body the optical path length in the vertical direction may also have a shorter path length. In other embodiments, the optical body 20 may "sit" on the circuit board in a conventional manner.

Circuit board 32 may also have other components electrically attached thereto besides the active components 34. By way of example, other electronic components 36 such as integrated circuits (IC) capable of driving the active optical components or signal processing may be attached to circuit board 36. By way of example, ICs such as the laser drivers, transimpedance amplifier (TIA), clock and data recovery (CDR), serializer/deserializer (SerDes), and the like may be attached to circuit board 32. Further, electrical components such as the TIA and laser drivers relatively close to the active components such as photodiodes and VCSELs allows relatively short electrical trace length or wire bond lengths such as 100 microns or shorter for supporting high-speed data transfer rates such as 20 Gb/sec and higher rates.

Figure 2:
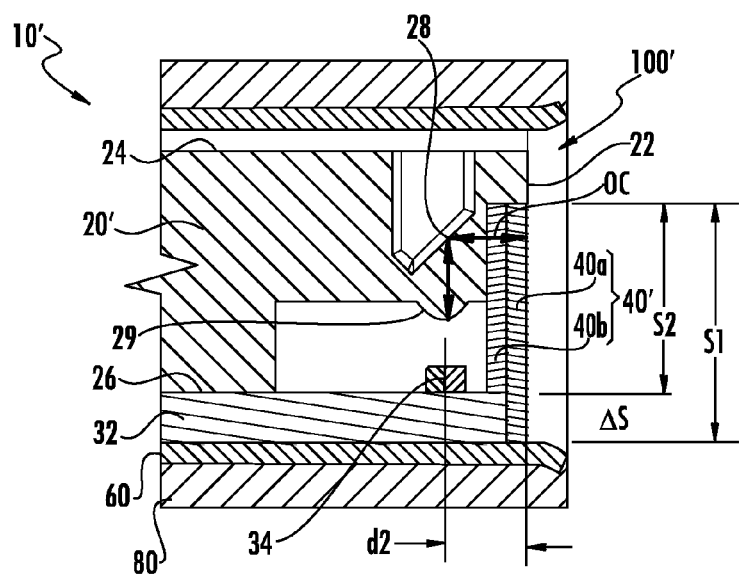
FIG. 2 is a cross-sectional view of a portion of an electronic device having another optical connector with another optical body having a different construction.

FIG. 2 is a cross-sectional view of a portion of another electronic device 10' having an optical connector 100' with an optical body 20' according to the concepts disclosed. Optical body 20' is similar to optical body 20 and the differences in the construction of optical body 20' will discussed in detail.

Like optical body 20, optical body 20' includes a front end 22, a top 24, a bottom 26, at least one optical channel OC comprising a total internal reflection (TIR) surface 28 and a lens 29. TIR surface 28 of optical body 20' turns the optical signal toward lens 29 or toward the front end 22 depending on whether the optical channel OC is a transmit optical channel or a receive optical channel. Lens 29 is located on the bottom 26 of optical body 20' and is located a distance d2 of 500 microns of less from the front end 22. Like optical body 20, window 40' is located adjacent to the front end 22 of optical body 20'. However, the window 40' comprises a laminated construction (e.g., a laminated window). Specifically, window 40' has a first layer 40a and a second layer 40b. First and second layers 40a,40b may be the same or different material as desired and are secured together in a suitable manner. The optical channel OC path length of optical body 20' may be relatively short compared with conventional optical bodies as discussed. Further, the distance d2 may have any suitable value from the front end 22 such as 500 microns or less to maintain a relatively short optical path length for the optical path length. But other distances are possible for distance d2, as an example, distance d2 may be 300 microns or less from the front end 22. In other embodiments, the optical bodies can have more lenses at other locations as desired such as adjacent to the front end as desired.

A portion of window 40' (e.g., laminated window) is attached to the front end 22 of optical body 20' and circuit board 32 having at least one active component 34. The circuit board 32 is attached to the optical body 20' so that at least one active component 34 of the circuit board 32 is suitably aligned to the lens 29 and the laminated window 40' has a staggered profile so that a portion of the window 40' is disposed within the footprint of the circuit board 32. As shown, first layer 40a has a dimension S1 and second layer 40b has a dimension S2, and dimension S1 is larger than dimension S2 to form a differential dimension ΔS between first layer 40a and second layer 40b. Thus, window 40' is set back so a portion (e.g., second layer 40b) is disposed over circuit board 32 so the footprints of the circuit board 32 and window 40' overlap in the horizontal direction. Consequently, the optical channel OC path length in the horizontal direction of optical body 20' may be shorter compared with optical body 20.

Figure 3:
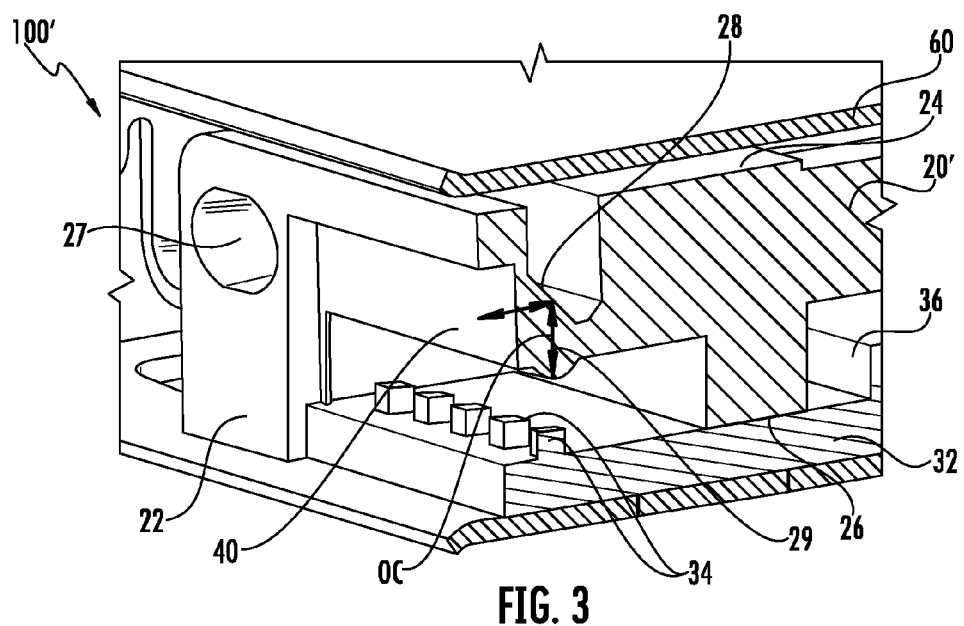
FIG. 3 is a partial front perspective cross-sectional view of the optical connector of FIG. 2.
Figure 5:
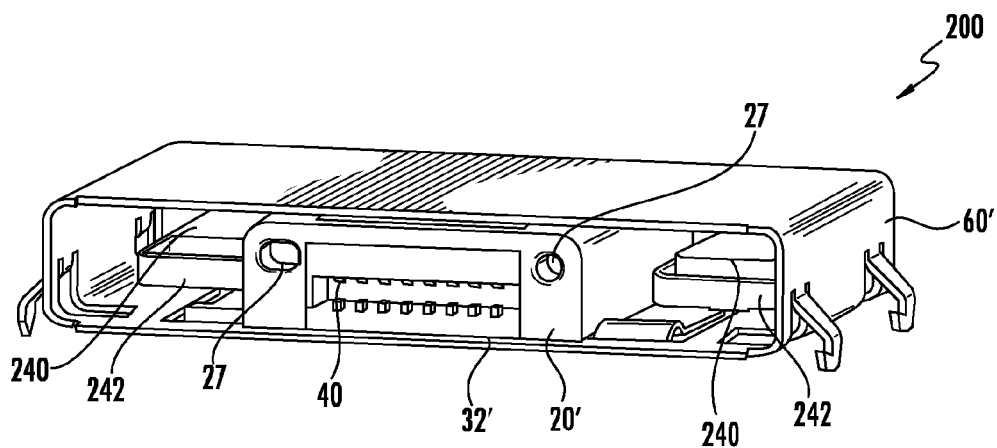
FIG. 5 is a front perspective view of the optical connector of FIG. 4.

FIG. 3 is a partial front perspective cross-sectional view of the optical connector 100'. As depicted, optical body 20' may further include one or more alignment features 27 disposed on the front end 22. Alignment features 27 may be any suitable structure such as bores, pins, castellation or the like. Alignment features 27 of optical body 20' cooperate with complimentary features such as pins, bores or the like on the complimentary connector for suitable aligning the optical channels of the respective optical interface portions (i.e., the mating portion of the optical body). In this embodiment, alignment features 27 are alignment bores; however, other suitable alignment features are possible for optical body 20' such as alignment pins or other structure. Alignment features 27 may be disposed on opposite sides of the optical channels OC as desired. In one embodiment, a first alignment bore may be a slot (e.g., with the long dimension of the slot arranged along the direction of a line drawn between the alignment features) and a second alignment bore is round such as shown in FIG. 5. Consequently, the alignment features can accommodate thermal expansion since one pin provides the X and Y alignment and the second pin provides rotational alignment and can inhibit stresses due to thermal dimensional changes.

Figure 4:
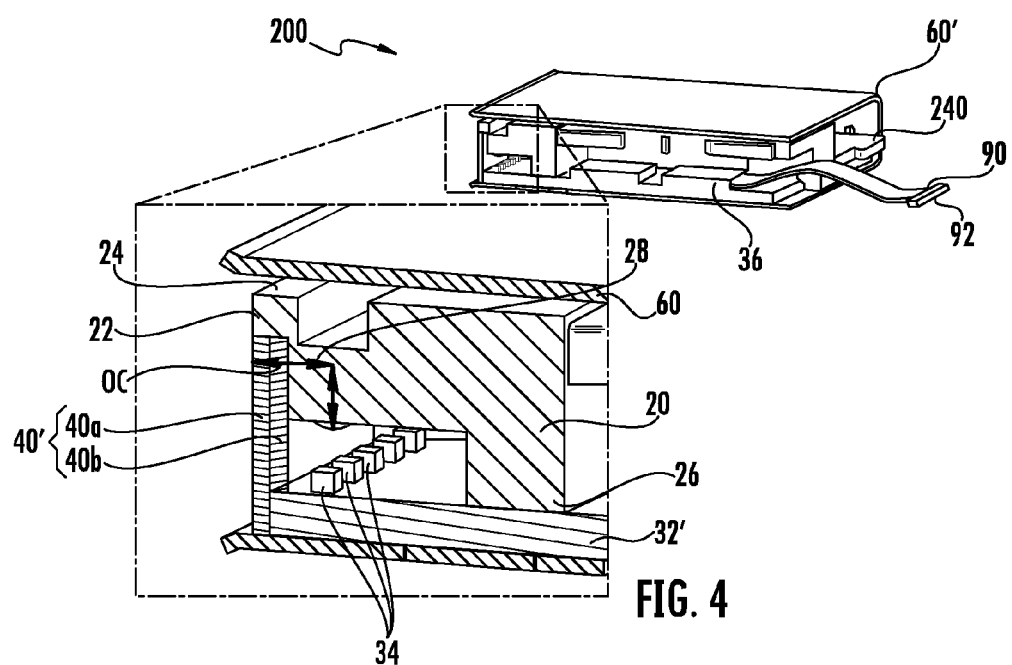
FIG. 4 is a full cross-sectional view of a hybrid optical connector similar to the optical connector of FIGS. 2 and 3 along with a detailed view of a portion of the optical connector.
Figure 6:
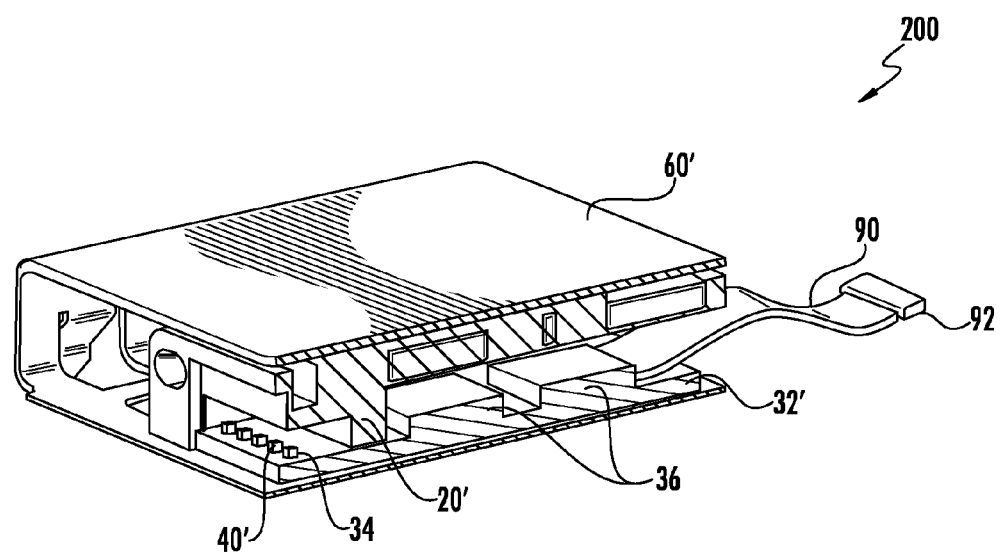
FIG. 6 is another cross-sectional perspective view of the optical connector of FIGS. 4 and 5.

The optical connectors disclosed may solely provide an optical connection or may have a hybrid optical and electrical connection as desired. FIGS. 4-6 depict another optical connector 200 comprising electrical contacts 240 that are disposed on opposite sides of the optical body 20'. FIG. 4 is a full cross-sectional view of a hybrid optical connector 200 that is similar to the optical connectors 100,100'. FIG. 5 is a front perspective view of the optical connector 200 and FIG. 6 is another cross-sectional perspective view of the optical connector 200.

Optical connector 200 is similar to optical connector 100 and uses optical body 20', but has one or more electrical contacts 240 disposed within shell 60' and disposed on outboard sides of the optical body 20'. The one or more electrical contacts 240 may be disposed on respective rails 250 that are formed from a dielectric material for electrically isolating the electrical contacts 240 from the shell 60'. The electrical contacts 240 are wiping contacts, but the used of other suitable electric contacts are possible. In other embodiments, the rails 250 may be integrally formed with the optical body 20'; however, this may not be desirable since the forces from the electrical connector may be transferred to the optical body and potentially cause misalignment. For instance, the optical connector 10 includes one or more pogo pin electrical contacts 40 in the one or more bores, which may inhibit forces from being transferred to the optical body. In this arrangement, the electrical contacts are inserted into the bores from the back and a portion of the electrical contacts extend beyond the front end. Electrical contacts 40 may be secured to optical body 20 in other suitable manners such a friction fit, mechanical attachment or an adhesive. Additionally, the electrical contacts may be arranged in a suitable manner for making the electrical connection to the device. Likewise, the other optical connectors disclosed 100,100' may also optionally include one or more electrical contacts as desired. In still other embodiments, the optical body may comprise one or more bores adjacent to the front end for receiving one or more electrical contacts 40. In still further embodiments, optical bodies disclosed herein may also optionally include one or more openings for receiving one or more magnetic materials for securing the optical connector to a complementary optical connector.

As shown, circuit board 32' has an electrical tether 90 attached thereto for transferring electrical signals to another location such as another circuit board. By way of explanation, the tether 90 is used for making electrical connections from circuit board 32' to another circuit board such as a daughter circuit board being electrically connected to a mother circuit board of the electronic device. Tether 90 may optionally include one or more electrical connectors 92 on one or both ends of tether 90 for plug and play electrical connectivity.

The disclosure is also directed to method for making an optical connector. One explanatory method of making an optical connector includes the steps of providing an optical body comprising a front end, a top, a bottom, and at least one optical channel comprising a TIR surface and a lens, where the lens is located on the bottom of the optical body and is a distance of 500 microns or less from the front end; and attaching the optical body to a shell of the optical connector. The method may also optionally include the step of attaching a window adjacent to the front end of the optical body. Another optional step includes attaching a circuit board to the optical body so that at least one optical component of the circuit board is aligned with a lens of the optical body.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An electronic device comprising:
    an optical body comprising:
        a front end having a recess, a top and a bottom, and at least one optical channel comprising a total internal reflection (TIR) surface and a lens, wherein the lens is located on the bottom and is a distance of 500 microns or less from the front end; and
        a laminated window adjacent to the front end that is secured into the recess so that the window is generally flush with the front end; and
    a circuit board having at least one active component, wherein the laminated window is attached to the front end of the optical body and the circuit board is attached to the optical body such that the at least one active component of the circuit board is aligned with the lens, and the laminated window has a staggered profile such that a portion of the window is disposed within a footprint of the circuit board.

2. The electronic device of claim 1, wherein the lens is a distance of 300 microns or less from the front end.

3. The electronic device of claim 1, the optical body comprising one or more alignment features at the front end of the optical body.

4. The electronic device of claim 3, wherein the one or more alignment features comprising one or more bores.

5. The electronic device of claim 3, wherein the one or more alignment features are alignment pins.

6. The electronic device of claim 1, further including one or more electrical contacts.

7. The electronic device of claim 1, wherein:
    the laminated window comprises a first layer having a first dimension and a second layer having a second dimension,
    the first dimension is larger than the second dimension,
    the first layer of the laminated window is attached to the front end of the optical body and the circuit board having at least one active component, and
    the second layer of the laminated window is disposed within the footprint of the circuit board.

8. The electronic device of claim 1, wherein the circuit board is recessed within a bottom pocket of the optical body.

9. An electronic device comprising:
    an optical body comprising:
        a front end having a recess, a top and a bottom, and at least one optical channel comprising a total internal reflection (TIR) surface and a lens, wherein the lens is located on the bottom and is a distance of 500 microns or less from the front end; and a laminated window adjacent to the front end that is secured into the recess so that the laminated window is generally flush with the front end; and a circuit board having at least one active component, wherein:

the circuit board is attached to the optical body so the at least one active component of the circuit board is aligned with the lens, the laminated window comprises a first layer having a first dimension and a second layer having a second dimension, the first dimension is larger than the second dimension, the first layer of the laminated window is attached to the front end of the optical body and the circuit board having at least one active component, and the laminated window has a staggered profile so that the second layer of the laminated window is disposed within a footprint of the circuit board.

10. The electronic device of claim 9, wherein the lens is a distance of 300 microns or less from the front end.

11. The electronic device of claim 9, the optical body comprising one or more alignment features at the front end of the optical body.

12. The electronic device of claim 11, wherein the one or more alignment features comprising one or more bores.

13. The electronic device of claim 11, wherein the one or more alignment features are alignment pins.

14. The electronic device of claim 9, further including one or more electrical contacts.

15. The electronic device of claim 9, wherein the circuit board is recessed within a bottom pocket of the optical body.

16. An electronic device, comprising:

an optical receptacle comprising an optical body comprising a front end having a recess, a top and a bottom, and at least one optical channel comprising a total internal reflection (TIR) surface and a lens, wherein the lens is located on the bottom;

a circuit board having at least one active component, wherein the circuit board is attached to the optical body so the at least one active component of the circuit board is aligned with the lens; and a laminated window attached to the front end of the optical body that is secured into the recess so that the laminated window is generally flush with the front end, wherein:

the laminated window comprises a first layer having a first dimension and a second layer having a second dimension, the first dimension is larger than the second dimension, the first layer of the laminated window is attached to the front end of the optical body, and the laminated window has a staggered profile so that the second layer of the laminated window is disposed within a footprint of the circuit board.

17. The electronic device of claim 16, wherein the lens is a distance of 500 microns or less from the front end.

18. The electronic device of claim 16, the optical body comprising one or more alignment features at the front of the optical body.

19. The electronic device of claim 16, further including one or more electrical contacts.

20. The electronic device of claim 16, wherein the circuit board is recessed within a bottom pocket of the optical body.

21. A method for making an optical connector, comprising:

providing an optical body comprising a front end having a recess, a top and a bottom, and at least one optical channel comprising a total internal reflection (TIR) surface and a lens, wherein the lens is located on the bottom and is a distance of 500 microns or less from the front end;

attaching a laminated window adjacent to the front end of the optical body that is secured into the recess so that the window is generally flush with the front end; and attaching the laminated window and the optical body to a circuit board, wherein:

the laminated window comprises a first layer having a first dimension and a second layer having a second dimension, the first dimension is larger than the second dimension, the first layer of the laminated window is attached to the front end of the optical body, and the laminated window has a staggered profile so that the second layer of the laminated window is disposed within a footprint of the circuit board.

22. The method of claim 21, further comprising attaching the optical body to a shell of the optical connector.

23. The method of claim 21, wherein the circuit board is attached to the optical body such that the circuit board is recessed within a bottom pocket of the optical body.

* * * * *